(12) United States Patent
Tang et al.

(10) Patent No.: US 9,570,979 B2
(45) Date of Patent: Feb. 14, 2017

(54) VOLTAGE REGULATOR WITH POWER STAGE SLEEP MODES

(71) Applicant: Infineon Technologies Austria AG, Villach (AT)

(72) Inventors: Benjamim Tang, Rancho Palos Verdes, CA (US); Jens Ejury, Fremont, CA (US); Giuseppe Bernacchia, Porcia (IT); Simone Fabbro, Udine (IT); Aliaksandr Subotski, Villach (AT); Karl Norling, Villach (AT)

(73) Assignee: Infineon Technologies Austria AG, Villach (AT)

( * ) Notice: Subject to any disclaimer, the term of this patent is extended or adjusted under 35 U.S.C. 154(b) by 6 days.

(21) Appl. No.: 14/255,079

(22) Filed: Apr. 17, 2014

(65) Prior Publication Data

US 2015/0303799 A1 Oct. 22, 2015

(51) Int. Cl.
*G05F 1/00* (2006.01)
*H02M 3/158* (2006.01)
*H02M 1/00* (2006.01)

(52) U.S. Cl.
CPC .......... *H02M 3/158* (2013.01); *H02M 3/1584* (2013.01); *H02M 2001/0032* (2013.01); *Y02B 70/16* (2013.01)

(58) Field of Classification Search
CPC .................. H02M 3/156; H02M 3/157; H02M 2001/0045; H02M 3/1588; H02M 2001/0032; H02M 3/158; H02M 2001/0035; H02M 3/1582; H02M 3/1584; Y02B 70/14; Y02B 70/1458; Y02B 70/1466

USPC ....... 323/268, 271, 282, 283, 285, 350, 272; 713/300, 320

See application file for complete search history.

(56) References Cited

U.S. PATENT DOCUMENTS

| | | | |
|---|---|---|---|
| 5,903,138 A * | 5/1999 | Hwang ............... | H02M 1/4225 323/224 |
| 2002/0135338 A1* | 9/2002 | Hobrecht et al. ............. | 323/272 |
| 2006/0132109 A1* | 6/2006 | Rodriguez et al. ........... | 323/282 |
| 2010/0072963 A1* | 3/2010 | Wang ..................... | H02M 3/156 323/282 |
| 2010/0219800 A1* | 9/2010 | Fukuoka ............. | H01L 27/0203 323/282 |
| 2011/0210709 A1* | 9/2011 | Mounier ................... | H02J 1/14 323/271 |
| 2014/0070781 A1* | 3/2014 | Yanagida ...................... | 323/271 |
| 2015/0076906 A1* | 3/2015 | Tamegai ............... | H02M 3/156 307/31 |

* cited by examiner

*Primary Examiner* — Adolf Berhane
*Assistant Examiner* — Alex Torres-Rivera
(74) *Attorney, Agent, or Firm* — Murphy, Bilak & Homiller, PLLC

(57) ABSTRACT

A power stage of a voltage regulator includes a first switch for connecting a load to a supply voltage in a first switching state of the power stage, a second switch for connecting the load to ground in a second switching state of the power stage and driver circuitry for setting the power stage in the first switching state, the second switching state or a non-switching state in which both switches are off responsive to a switching control signal received by the power stage. A power management unit moves the power stage from a nominal power mode to a first low power mode if the power stage is in the non-switching state for a predetermined time period.

21 Claims, 5 Drawing Sheets

VOLTAGE REGULATOR WITH POWER STAGE SLEEP MODES

TECHNICAL FIELD

The present application relates to voltage regulators, in particular voltage regulator power management.

BACKGROUND

Voltage regulators are widely used in modern electronic systems for a variety of applications such as computing (server and mobile) and POLs (Point-of-Load Systems) for telecommunications because of their high efficiency and small amount of area/volume consumed by such converters. Widely accepted voltage regulator topologies include buck, boost, buck-boost, forward, flyback, half-bridge, full-bridge, and SEPIC topologies. Multiphase buck converters are particularly well suited for providing high current at low voltages needed by high-performance integrated circuits such as microprocessors, graphics processors, and network processors. Buck converters are implemented with active components such as a pulse width modulation (PWM) controller IC (integrated circuit), driver circuitry, one or more phases including power MOSFETs (metal-oxide-semiconductor field-effect transistors), and passive components such as inductors, transformers or coupled inductors, capacitors, and resistors. Multiple phases (power stages) can be connected in parallel to the load through respective inductors to meet high output current requirements.

Voltage regulators ideally have high efficiency under all load conditions, including light load, and low power loss when the regulator is off. High power voltage regulators often employ separate controllers and power stages. For example, high power DC-DC voltage regulators typically have a single phase (power stage) or multiple phases e.g. in the case of multiphase buck converters. The power stages of a voltage regulator can be discrete (separate driver and power switch packages) or integrated (one package contains driver and power switches). Integrated power stages include advanced circuitry such as internal supply rails, bootstrap supply, integrated current sense, integrated temperature sense, etc. Light load conditions result in periods where the power stage has little or no activity. Multiphase converters typically have the ability to drop phases, where one or more phases are not actively switching and not supporting any of the additional current. In addition, for extremely light load currents, phases may be operating in pulse frequency mode, where a substantial amount of time passes between switch cycles in which the power stage is not switching. Thus, DC-DC voltage regulators have multiple operating modes where having one or more power stages in sleep mode is desirable to reduce power loss. The delay associated with exiting sleep mode is an important performance parameter for the power stage, in certain cases some exit delay is acceptable, and in other cases the power stage must immediately respond to changes in its input.

Some conventional DC-DC voltage regulators forgo the complexities associated with implementing power stage sleep mode, and therefore do not offer this feature. For these regulators some internal circuitry that could otherwise be disabled remains on in the power stage, unnecessarily increasing power dissipation of the voltage regulator. Other conventional DC-DC voltage regulators provide a dedicated pin for indicating when the power stage should enter sleep mode. This approach requires the controller and each power stage (phase) of the voltage regulator to have an extra pin/signal for enabling this feature, increasing the system size and cost. Also, voltage regulation is conventionally disabled in sleep mode which requires high latency for the power stage to resume normal voltage regulation upon exiting the sleep mode. Also, conventional sleep mode implementations do not optimize pulse frequency and phase drop modes of operation relative to power stage power dissipation.

SUMMARY

According to an embodiment of a power stage of a voltage regulator, the power stage comprises a first switch operable to connect a load to a supply voltage in a first switching state of the power stage, a second switch operable to connect the load to ground in a second switching state of the power stage, driver circuitry, and a power management unit. The driver circuitry is operable to set the power stage in the first switching state, the second switching state or a non-switching state in which both switches are off responsive to a switching control signal received by the power stage. The power management unit is operable to move the power stage from a nominal power mode to a first low power mode if the power stage is in the non-switching state for a predetermined time period.

According to an embodiment of a voltage regulator, the voltage regulator comprises a power stage and a controller. The power stage is operable to connect a load to a supply voltage in a first switching state, connect the load to ground in a second switching state, enter the first switching state, the second switching state or a non-switching state responsive to a switching control signal, move from a nominal power mode to a first low power mode after being in the non-switching state for a predetermined time period, and move from the first low power mode to a second low power mode responsive to a control signal instructing the power stage to enter the second low power mode. The controller is operable to set the switching control signal to indicate the non-switching state long enough to force the power stage to move from the nominal power mode to the first low power mode, and after waiting enough time to ensure the power stage is in the first low power mode, send the control signal instructing the power stage to enter the second low power mode.

According to an embodiment of a controller for a voltage regulator, the controller comprises an interface operable to communicate with a power stage of the voltage regulator and control logic operable to signal the power stage to enter a non-switching state and move from a nominal power mode to a first low power mode. After waiting enough time to ensure the power stage is in the first low power mode, the controller is also operable to signal the power stage to enter a second low power mode in which the power stage is designed to consume less power and have more latency in exiting from the second low power mode than in the first low power mode.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

The embodiments described herein provide a voltage regulator that includes a controller and one or more power stages (phases) having sleep (low power) and deep sleep (lower power) modes. The controller signals entry/exit into the sleep and deep sleep modes. The sleep mode has no exit latency, and therefore each power stage can respond near instantaneously to changes in its switching control signal input. The deep sleep mode has exit latency but dissipates less power than the sleep mode, and the controller waits until the power stage circuitry is ready before instructing the corresponding power stage to resume switching. With such a voltage regulator design, power dissipation can be reduced when (i.e. at or during which time) voltage regulation is disabled and in pulse frequency and phase drop modes because the internal power stage circuitry can be turned off. The power stage response to a change in the operating mode of the regulator is not affected because there is either no exit latency in the sleep mode, or exit latency in the deep sleep mode is already accounted for by the regulator system.

Figure 1:
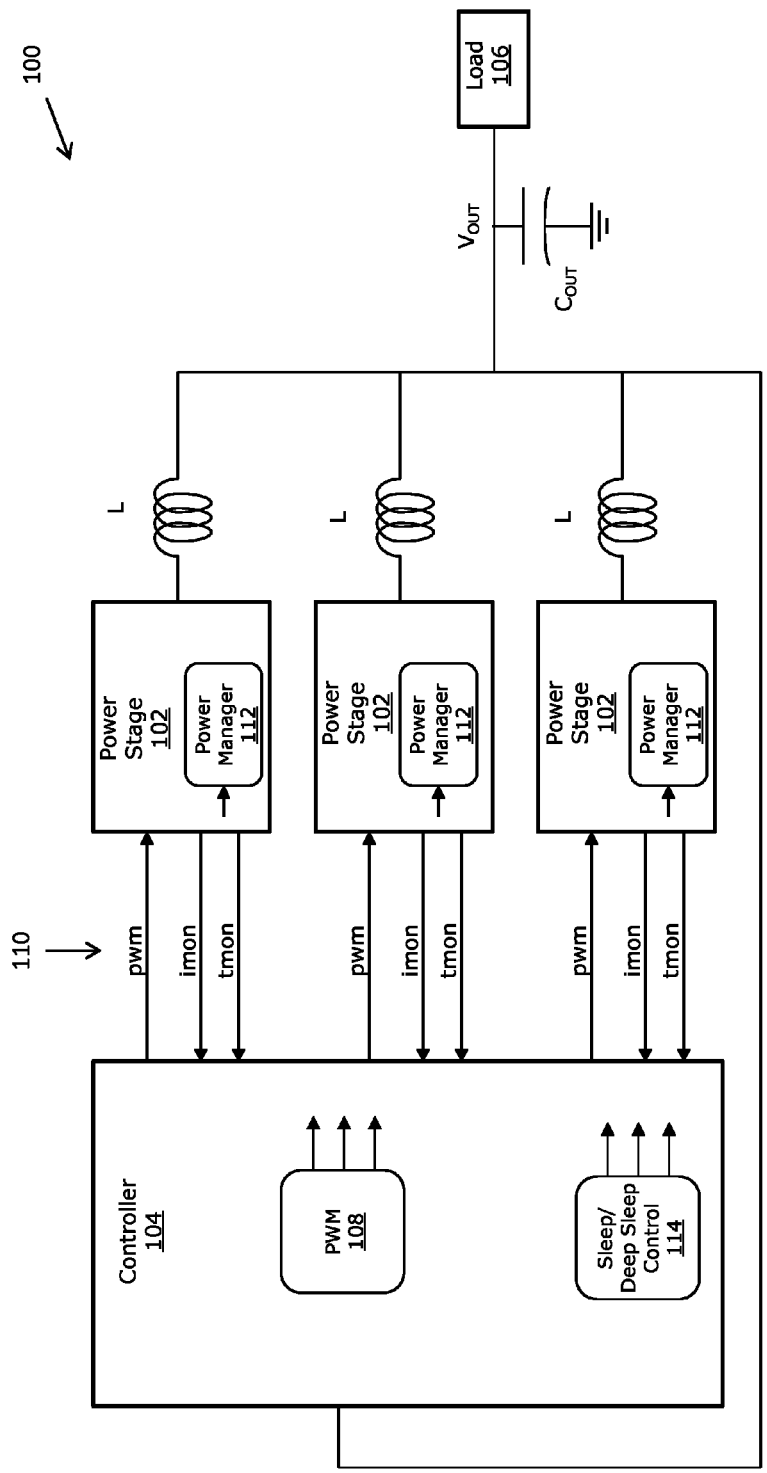
FIG. 1 illustrates a block diagram of an embodiment of a voltage regulator with different power stage sleep modes.

FIG. 1 illustrates an embodiment of a voltage regulator 100 comprising a plurality of power stages 102 and a controller 104 such as a microcontroller, microprocessor, ASIC (application-specific integrated-circuit), etc. for controlling operation of the power stages 102. Three power stages 102 are shown in FIG. 1 for exemplary purposes only, however the voltage regulator 100 can include any number of power stages 102 including a single power stage 102 (i.e. single-phase regulator) or more than one power stage 102 (i.e. multiphase regulator).

The power stages 102 provide a regulated voltage to a load 106. Each power stage 102 is operable to deliver a phase current through one or more inductors (L) to the load 106 which is connected to the voltage regulator 100 via the inductors and one or more output capacitors (Cout) in parallel with the regulator output. The load 106 can be a high-performance integrated circuit such as a microprocessor, graphics processor, network processor, etc. or other type of electronic circuit requiring voltage regulation. Each power stage 102 connects the load 106 to an input voltage of the voltage regulator 100 in a first switching state and to ground in a second switching state.

The controller 104 manages the switching states of each power stage 102 to regulate the voltage (Vout) delivered to the load 106, by adjusting the phase currents delivered to the load 106. In the case of PWM (pulse width modulation) based switching of the power stages 102, the controller 104 includes a PWM unit 108 that generates PWM control signals (pwm) for switching the power stages 102. If the load current is low (e.g. lower than half of the phase current), synchronous converters allow the negative current (reverse current) to flow through low-side switches of one or more of the power stages 102 where it is dissipated. However if a low-side switch is off, the corresponding body diode cannot conduct the reverse current and it stays in HiZ (high impedance) or zero current which is called DCM (discontinuous conduction mode). The voltage regulator 100 can also operate in a continuous conduction mode (CCM) with current sinking capability. In general, the switching state and duty cycle of the individual power stages 102 are determined at least in part based on the output voltage (Vout) provided to the load 106 so that the voltage regulator 100 can react quickly and reliably as possible to changing load conditions.

The controller 104 can manage changes from one reference voltage to another. The controller 104 can also determine errors between the output voltage (Vout) and a reference voltage, and convert the error voltage into a digital representation provided to the PWM unit 108 for modifying the switching state and/or duty cycle of the power stages 102 e.g. by adjusting the duty cycle of the PWM control signals. Such voltage regulation functions are standard in typical digitally-controlled switching power converters, and therefore no further explanation is given in this regard.

A signaling interface 110 is provided between the controller 104 and the power stages 102. Among other functions, the controller 104 can manage the different power modes of the power stages 102 via the interface 110.

Figure 2:
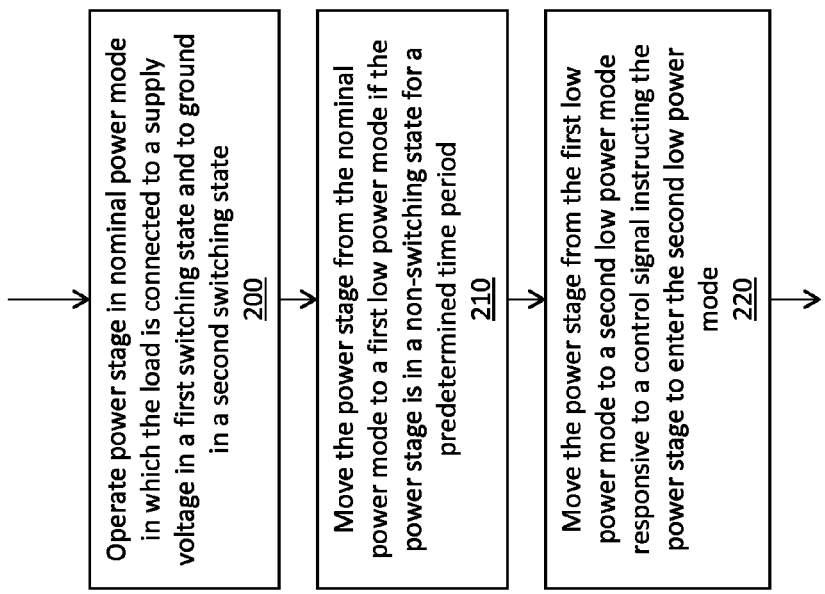
FIG. 2 illustrates a flow diagram of an embodiment of managing different power modes of a voltage regulator power stage by a controller of the voltage regulator.

FIG. 2 illustrates a flow diagram of an embodiment of managing the different power modes of the power stages 102 by the regulator controller 104. Each power stage 102 operates in a nominal (switching) power mode in either switching state (Block 200). The power stages 102 each have a power management unit 112 for entering and exiting into sleep (low power) and deep sleep (lower power) modes when in a non-switching state. The controller 104 can signal individual ones of the power stages 102 in such a way that forces a power stage 102 to enter the non-switching state and move from the nominal power mode to the sleep mode in order to reduce regulator power dissipation (Block 210). After the power stage 102 is in the sleep mode, the controller 104 can signal the power stage 102 to move from the sleep mode to the deep sleep mode to even further reduce regulator power dissipation (Block 220).

Figure 3:
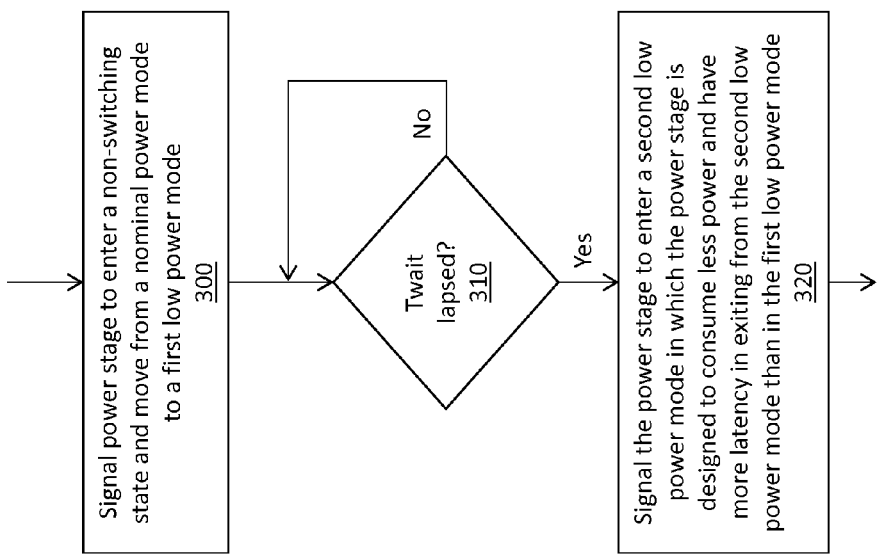
FIG. 3 illustrates a flow diagram of an embodiment of forcing a voltage regulator power stage to move from a low power mode to a lower power mode by a controller of the voltage regulator.
Figure 4:
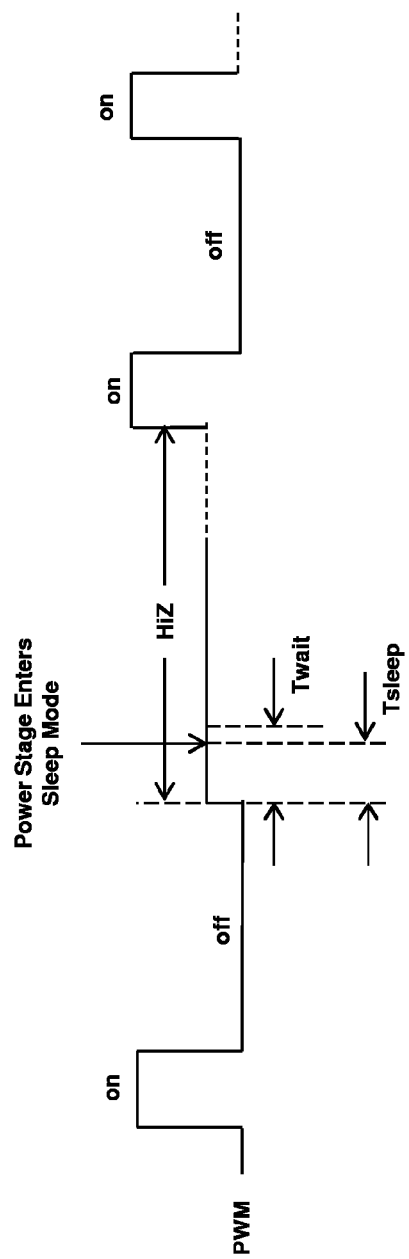
FIG. 4 illustrates a PWM control signal generated by a controller of a voltage regulator for forcing a power stage of the voltage regulator to move from a low power mode to a lower power mode.

FIG. 3 illustrates a flow diagram of an embodiment of the regulator controller 104 forcing a power stage 102 to move from the sleep mode to the deep sleep mode. According to this embodiment, the switching state of the power stage 102 is determined by PWM control. The power stage 102 connects the load 106 to an input voltage of the voltage regulator 100 in a first switching state when the PWM control signal provided to the power stage 102 is active (on) and to ground in a second switching state when the PWM control signal is not active (off) as shown in FIG. 4. The power stage 102 operates in the nominal power mode in either PWM switching state (i.e. PWM on or off). To force the power stage 102 into the sleep mode, the controller 104 deactivates the PWM control signal to indicate a HiZ state in which the power stage 102 does not switch i.e. the high-side and low-side switches of the power stage 102 are off. If the power management unit 112 of the power stage 102 detects the PWM control signal is in the HiZ non-switching state for a predetermined period of time, the power stage 102 moves from the nominal power mode to the sleep (low power) mode (Block 300). The controller 102 includes control logic 114 that keeps the PWM control signal asserted in the HiZ state for a sufficient period of time to force the power stage 102 into the sleep mode. The power management unit 112 of the power stage 102 deactivates some circuitry within the power stage 102 to reduce power dissipation in the sleep mode. The control logic 114 of the controller 104 waits enough time (Twait) to ensure the power stage 102 is in the sleep mode (Block 310). The wait time is a function of several variables such as inductor size, phase current magnitude, etc. When this time limit lapses, the phase current in the power stage inductor should be zero and the controller 104 can signal the power stage 102 to enter the deep sleep (lower power) mode (Block 320). Alternatively, the controller 104 can include a smart driver which knows when the inductor current is zero. In either case, the power management unit 112 of the power stage 102 deactivates additional circuitry within the power stage 102 in response to the signal from the controller 104 to further reduce power dissipation.

The voltage regulator power stages 102 are designed to consume less power and have more latency in exiting from the deep sleep mode than in the sleep mode. The power mode signaling between the controller 104 and the power stages 102 can be implemented using one or more dedicated pins. Alternatively, the power mode signaling can be implemented via one or more pins which are used by the power stages 102 to report information to the controller 104 in the nominal power mode. These pin(s) are not used by the power stages 102 to report information when the power stages 102 are in the non-switching state, and therefore the shared pin(s) can be re-used to control entering and exiting of at least the deep sleep power mode by the power stages 102.

Circuitry of the power stages 102 such as internal supplies, boot circuitry, integrated current sense circuitry, integrated temperature sense circuitry and internal bias circuits can be turned off in the sleep and/or deep sleep modes to save power. The voltage regulator 100 can use the sleep and deep sleep modes for disabling internal circuitry of the power stages 102 to minimize power loss during light-load operation. For example in sleep mode, a power stage 102 can include current and/or temperature sense circuitry which is not needed in sleep mode because the phase current is zero and temperature is non-critical since the power stage 102 is idle/not switching. The current and/or temperature sense circuits can be disabled in the sleep mode to reduce power dissipation. The controller 104 can then signal the power stage 102 to move from the sleep mode to the deep sleep mode by re-using the pin(s) used in the nominal power mode to communicate the current and/or temperature sense information (imon/tmon) from the power stage 102 to the controller 104. Since these pin(s) are not used in the non-switching state, they can be re-used to force the power stage 102 to enter the lower-power deep sleep mode and subsequently exit from the deep sleep mode back to the sleep mode.

Figure 5:
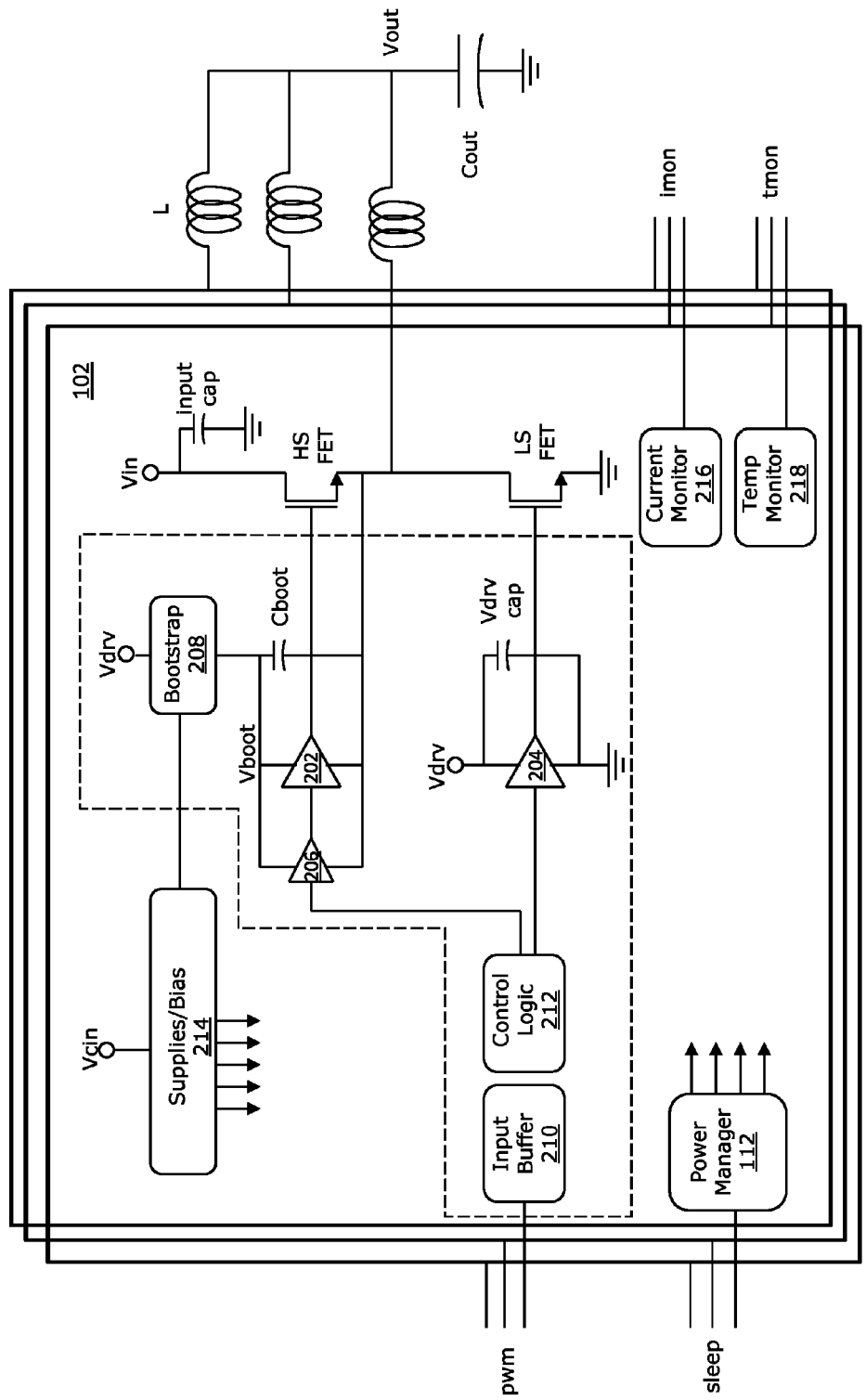
FIG. 5 illustrates a block diagram of an embodiment of a voltage regulator power stage with different sleep modes.

FIG. 5 illustrates an embodiment of a voltage regulator power stage 102 with different low power modes in more detail. The power stage 102 includes a high-side switch (HS FET) such as a power MOSFET (metal oxide semiconductor field effect transistor) or other type of power transistor that connects the load (not shown in FIG. 5) to a supply voltage (Vin) in one switching state, and a low-side switch (LS FET) such as a power MOSFET or other type of power transistor that connects the load to ground in another switching state. The power stage 102 also includes driver circuitry 200 for setting the power stage 102 in the first switching state (high-side switch on, low-side switch off), the second switching state (high-side switch off, low-side switch on) or a non-switching state (high-side switch off, low-side switch off) responsive to a switching control signal (pwm) received by the power stage 102.

The driver circuitry 200 can include a high-side driver 202 that generates the control signal for the gate of the high-side switch, a low-side driver 204 that generates the control signal for the gate of the low-side switch, a level shifter 206 for the high-side switch, a boot capacitor (Cboot) for the high-side switch, and a bootstrap circuit 208 for charging the boot capacitor. The driver circuitry 200 can further include an input buffer 210 for receiving a switching control signal (pwm) which can include a single or multiple input signals. The switching control signal represents the switching state of the power stage 102 i.e. the first switching state where the high-side switch is connected to the load, the second switching state where the low-side switch is connected to the load and the non-switching state where neither the high-side switch nor the low-side switch is connected to the load. The power stage driver circuitry 200 can also include driver control logic 212 for generating internal signals so to that the high-side and low-side drivers 202, 204 generate the appropriate gate control signals for the high-side and low-side switches so that each switching state can be implemented.

The power stage 102 can have one or more voltage supplies and input bias circuits 214. For example, the power stage 102 can include an input supply (Vin) used to drive the high-side and low-side switches, a driver supply (Vdrv) used to drive the low-side gate driver 204 and the high-side gate driver bootstrap circuit 208, a core supply (Vcin) used to drive the internal logic and control circuitry 210, 212 of the power stage 102, an internally generated bootstrap supply (Vboot) for the high-side gate driver 202, etc.

The power stage 102 can include additional components. For example the power stage 102 can include a current monitor 216 for measuring or sensing the output current of the power stage 102 through the inductor (L) in the first and second switching states and a temperature sensor 218 for measuring the temperature of the power stage 102 in the first and second switching states. Any standard current monitor 216 and temperature sensor 218 can be used.

The power stage 102 also includes a power management unit 112 as previously described herein. The power management unit 112 includes the control logic and timers for placing the power stage 102 into sleep (low power) and deep sleep (lower power) modes. The power management unit 112 can move the power stage 102 from the nominal power mode to the sleep mode if the power stage 102 is in the non-switching state for a predetermined time period and move the power stage 102 from the sleep mode to a deep mode responsive to a control signal (sleep) instructing the power stage 102 to enter the deep sleep mode e.g. as previously described herein in connection with FIGS. 2-4.

For example under PWM control, the power management unit 112 can place the power stage 102 in the sleep mode after the PWM control signal (pwm) is in the HiZ state for longer than a predetermined time period (Tsleep in FIG. 4). The control signal (sleep) instructing the power stage 102 to move from the sleep mode to the deep sleep mode can be provided by a dedicated pin(s). Alternatively, the pin(s) used by the current monitor 216 for sending the power stage output current information (imon) sensed in the nominal power mode to the controller 104 can be re-used by the controller 104 to communicate the sleep control signal to the power stage 102. In another embodiment, the pin(s) used by the temperature sensor 218 for sending the power stage temperature information (tmon) measured in the nominal power mode to the controller 104 can be re-used by the controller 104 to communicate the sleep control signal to the power stage 102.

In each case, the power management unit 112 can disable different ones of the power stage components depending on whether the power stage 102 is in the sleep mode or deep sleep mode. 'Disabled' as used herein means depowering, deactivating, or other action that reduces power dissipation of the power stage component being disabled. For example, the power management unit 112 can disable the current monitor 216 and/or the temperature sensor 218 in both the sleep and deep sleep modes because the power stage output current is zero and the power stage temperature is non-critical when the power stage 102 is idle/not switching. The power management unit 112 can disable the driver circuitry 200 in the deep sleep mode but not the sleep mode so that the power stage 102 can near instantaneously return to the first switching state (PWM on) from the non-switching state (PWM HiZ) in the sleep mode. For example, one or more of the level shifter 206 and the bootstrap circuit 208 can be disabled in the deep sleep mode but not in the sleep mode. This way in the sleep mode, the bootstrap circuit 208 ensures the high-side driver 202 is at a proper voltage level for driving the gate of the high-side switch immediately in response to a rising edge transition of the PWM control signal.

The power management unit 112 can disable one or more of the input buffer 210 and the control logic 212 in the deep sleep mode but not in the sleep mode. For example the input biasing, input power supply (Vin), core power supply (Vcin), high-side and low-side driver supply (Vdrv) and the bootstrap supply (Vboot) remain enabled/active in sleep mode and disabled/deactivated in deep sleep mode. The input buffer 210 can include pull-up and pull-down resistors the biasing of which can be disabled in the sleep and deep sleep modes. The power management unit 112 can selectively disable the internal supply and bias circuits 214 of the power stage 102 in both sleep and deep sleep modes so long as the power stage 102 can near instantaneously return to the first switching state (PWM on) from the non-switching state (PWM HiZ) in the sleep mode.

The power management unit 112 can move the power stage 102 from the deep sleep mode back to the sleep mode responsive to the control signal (sleep) instructing the power stage 102 to exit the deep sleep mode. This includes re-powering/re-enabling/re-activating the power stage elements depowered/disabled/deactivated in the deep sleep mode. The power management unit 112 can move the power stage 102 from the sleep mode back to the nominal power mode responsive to the switching control signal (pwm) indicating that the power stage 102 is to resume switching e.g. by exiting the HiZ state into a rising edge transition. This includes re-powering/re-enabling/re-activating the power stage elements depowered/disabled/deactivated in the sleep mode. The power stage 102 can move from the sleep mode back to the nominal power mode without having to first precondition the gate drive signal levels for the high-side and low-side switches, in response to the switching control signal (pwm) indicating that the power stage 102 is to resume switching.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A power stage of a multi-phase voltage regulator having a plurality of phases, the power stage comprising:
a first switch operable to connect a load to a supply voltage in a first switching state of the power stage;
a second switch operable to connect the load to ground in a second switching state of the power stage;
driver circuitry operable to set the power stage in the firs switching state, the second switching state or a non-switching state in which both switches are off responsive to a switching control signal received by the power stage; and
a power management unit operable to move the power stage from a nominal power mode to a first low power mode if the power stage is in the non-switching state for a predetermined time period, and move the power stage from the first low power mode to a second low power mode responsive to a control signal instructing the power stage to enter the second low power mode,
wherein the power stage provides one phase of the multi-phase voltage regulator,
wherein the power management unit is operable to disable the driver circuitry in the second low power mode but not in the first low power mode so that the power stage can near instantaneously return to the first switching state from the non-switching state in the first low power mode.

2. The power stage of claim 1, wherein the power stage is designed to consume less power and have more latency in exiting from the second low power mode than the first low power mode.

3. The power stage of claim 1, further comprising a current monitor operable to measure an output current of the power stage in the first and second switching states, wherein the power management unit is operable to disable the current monitor in the first and second low power modes.

4. The power stage of claim 1, further comprising a temperature sensor operable to measure a temperature of the power stage in the first and second switching states, wherein the power management unit is operable to disable the temperature sensor in the first and second low power modes.

5. The power stage of claim 1, wherein the driver circuitry comprises a level shifter for the first switch, a boot capacitor for the first switch, and a bootstrap circuit for charging the boot capacitor, and wherein the power management unit is operable to disable one or more of the level shifter and the bootstrap circuit in the second low power mode but not in the first low power mode.

6. The power stage of claim 1, further comprising an input buffer operable to receive the switching control signal and control logic operable to control operation of the driver circuitry in response to the switching control signal, wherein the power management unit is operable to disable one or more of the input buffer and the co logic in the second low power mode but not in the first low power mode.

7. The power stage of claim 1, wherein the power management unit is operable to selectively disable one or more internal supply and bias circuits of the power stage in the first and second low power modes.

8. The power stage of claim 1, wherein the power management unit is operable to move the power stage from the second low power mode to the first low power mode responsive to the control signal instructing the power stage to exit the second low power mode and move the power stage from the first low power mode back to the nominal power mode responsive to the switching control signal indicating that the power stage is to resume switching.

9. The power stage of claim 1, wherein the power management unit is operable to move the power stage from the first low power mode back to the nominal power mode without having to first precondition gate drive signal levels for the first and second switches, in response to the switching control signal indicating that the power stage is to resume switching.

10. The power stage of claim 1, wherein the switching control signal is a PWM (pulse width modulation) control signal, and wherein the power management unit is operable to move the power stage from the nominal power mode to the first low power mode if the PWM control signal indicates a HiZ (high impedance) state for the first and second switches.

11. The power stage of claim 1, wherein the power stage comprises a pin used to communicate information from the power stage in the nominal power mode, and wherein the pin is re-used in the first low power mode to receive the control signal which instructs the power stage to enter the second low power mode.

12. A multi-phase voltage regulator, comprising:
a power stage operable to connect a load to a supply voltage in a first switching state, connect the load to ground in a second switching state, enter the first switching state, the second switching state or a non-switching state responsive to a switching control signal, move from a nominal power mode to a first low power mode after being in the non-switching state for a predetermined time period, and move from the first low power mode to a second low power mode responsive to a control signal instructing the power stage to enter the second low power mode;
a controller operable to set the switching control signal to indicate the non-switching state long enough to force the power stage to move from the nominal power mode to the first low power mode, and after waiting enough time to ensure the power stage is in the first low power mode, send the control signal instructing the power stage to enter the second low power mode; and
at least one of:
a current monitor operable to measure an output current of the power stage in the first and second switching states; and
a temperature sensor operable to measure the temperature of the power stage in the first and second switching states,
wherein the power stage is operable to disable the at least one of the current monitor and/or the temperature sensor in the first and second low power modes, wherein the power stage provides one phase of the multi-phase voltage regulator.

13. The multi-phase voltage regulator of claim 12, wherein the power stage is designed to consume less power and have more latency in exiting from the second low power mode than the first low power mode.

14. The multi-phase voltage regulator of claim 12, wherein the power stage comprises a level shifter, a boot capacitor, and a bootstrap circuit for charging the boot capacitor, and wherein the power stage is operable to disable one or more of the level shifter and the bootstrap circuit in the second low power mode but not in the first low power mode.

15. The multi-phase voltage regulator of claim 12, wherein the power stage comprises an input buffer operable to receive the switching control signal and control logic operable to control the first switching state, the second switching state or the non-switching state of the power stage in response to the switching control signal, and wherein the power stage is operable to disable one or more of the input buffer and the control logic in the second low power mode but not in the first low power mode.

16. The multi-phase voltage regulator of claim 12, wherein the power stage is operable near instantaneously return to the first switching state from the non-switching state the first low power mode.

17. The multi-phase voltage regulator of claim 12, wherein the power stage is operable to move from the second low power mode to the first low power mode responsive to the control signal instructing the power stage to exit the second low power mode and move from the first low power mode back to the nominal power mode responsive to the switching control signal indicating that the power stage is to resume switching.

18. The multi-phase voltage regulator of claim 12, wherein the switching control signal is a PWM (pulse width modulation) control signal, wherein the controller is operable to stop transitions in the PWM control signal to indicate a non-switching HiZ (high impedance) state, and wherein the power stage is operable to move from the nominal power mode to the first low power mode if the PWM control signal remains in the non-switching HiZ state for the predetermined tune period.

19. The multi-phase voltage regulator of claim 12, wherein the power stage comprises a pin used to communicate information from the power stage to the controller in the nominal power mode, and wherein the pin is re-used in the first low power mode to receive the control signal from the controller for instructing the power stage to enter the second low power mode.

20. The multi-phase voltage regulator of claim 19, wherein the pin is used to communicate temperature or current information from the power stage to the controller when the power stage is in the nominal power mode.

21. A power stage of a multi-phase voltage regulator having a plurality of phases, the power stage comprising:
a first switch operable to connect a load to a supply voltage in a first switching state of the power stage;
a second switch operable to connect the load to ground in a second switching state of the power stage;
driver circuitry operable to set the power stage in the first switching state, the second switching state or a non-switching state in which both switches are off responsive to a switching control signal received by the power stage; and
a power management unit operable to move the power stage from a nominal power mode to a first low power mode if the power stage is in the non-switching state for a predetermined time period, and move the power stage from the first low power mode to a second low power mode responsive to a control signal instructing the power stage to enter the second low power mode, wherein the power stage provides one phase of the multi-phase voltage regulator, wherein the power management unit is operable to move the power stage from the first low power mode back to the nominal power mode without having to first pre-condition gate drive signal levels for the first and second switches, in response to the switching control signal indicating that the power stage is to resume switching.

* * * * *

UNITED STATES PATENT AND TRADEMARK OFFICE
CERTIFICATE OF CORRECTION

PATENT NO. : 9,570,979 B2  
APPLICATION NO. : 14/255079  
DATED : February 14, 2017  
INVENTOR(S) : B. Tang et al.

Page 1 of 1

It is certified that error appears in the above-identified patent and that said Letters Patent is hereby corrected as shown below:

In the Claims

Column 8, Line 25 (Claim 1, Line 7), please change "firs" to -- first --

Column 9, Line 4 (Claim 6, Line 6), please change "co" to -- control --

Column 10, Line 43 (Claim 18, Line 9), please change "tune" to -- time --

Signed and Sealed this  
Fifth Day of September, 2017

Joseph Matal  
*Performing the Functions and Duties of the*  
*Under Secretary of Commerce for Intellectual Property and*  
*Director of the United States Patent and Trademark Office*